United States Patent [19]

Onda et al.

[11] 4,110,767
[45] Aug. 29, 1978

[54] SHUTTER AND VIEW FINDER FOR SINGLE LENSE REFLEX CAMERA

[75] Inventors: Eiichi Onda; Mitsuo Koyama; Ichiro Nemoto; Tadashi Nakagawa; Masanori Watanabe, all of Yotsukaido, Japan

[73] Assignee: Seiko Koki Kabushiki Kaisha, Japan

[21] Appl. No.: 760,980

[22] Filed: Jan. 21, 1977

[30] Foreign Application Priority Data

Jan. 22, 1976 [JP] Japan ............................ 51/5958[U]

[51] Int. Cl.² ............................................. G03B 19/12
[52] U.S. Cl. ................................................. 354/152
[58] Field of Search ............... 354/152, 156, 158, 288

[56] References Cited

U.S. PATENT DOCUMENTS 3,866,240  2/1975  Tsujimoto .................. 354/152 X

FOREIGN PATENT DOCUMENTS 221,357  5/1962  Austria ..................... 354/152
387,950  1/1924  Fed. Rep. of Germany ........... 354/152

*Primary Examiner*—John Gonzales
*Attorney, Agent, or Firm*—Robert E. Burns; Emmanuel J. Lobato; Bruce L. Adams

[57] ABSTRACT

In a single lens reflex camera, the shutter base plate is provided with a recess in which the reflecting mirror is mounted. This permits the mirror to be closer to the film plane and hence permits the imaging plane, prism and viewing lens of the view finder to be closer to the optical axis of the camera lens, thus reducing the overall size of the camera.

3 Claims, 2 Drawing Figures

SHUTTER AND VIEW FINDER FOR SINGLE LENSE REFLEX CAMERA

FIELD OF INVENTION

The present invention relates to single lens reflex cameras and particularly to shutters and view finders of such cameras constructed in such manner as to reduce the overall size of the camera.

BACKGROUND OF THE INVENTION

In a single lens reflex camera the light passing through the photographing lens is directed by an inclined reflecting mirror to an imaging plane so as to form on the imaging plane an image of the subject to be photographed. The image is viewed through a prism and viewing lens which project up above the camera case. When an exposure is made the reflecting mirror is swung up out of the way and the shutter is momentarily opened so that an image of the subject to be photographed is formed on the film. In order that a sharp image is alternately formed on the imaging plane and on the film, the imaging plane must be in conjugate relation to the film plane when the mirror is in viewing condition. By reason of this relationship the view finder comprising the viewing lens and prism must project a considerable distance upwardly above the outline of the camera frame.

SUMMARY OF THE INVENTION

It is an object of the present invention to construct the shutter and view finder of a single lens reflex camera in such manner as to reduce the upward projection of the view finder and reduce the overall size of the camera.

In accordance with the invention the camera is constructed so that the imaging plane of the view finder is brought closer to the optical axis of the camera so as to minimize the protruding height of the portion from the camera outline. Consequently such construction is adopted that the mirror for reflecting light passing through the photographic lens to the finder's side is supported so that the position of the plane of photo-sensitive material and the imaging plane of the finder are mutually conjugated at a position close to the plane of the photo-sensitive material.

In accordance with the invention the shutter base plate constituting the space in which the shutter blades are actuated is provided on its forward face with a recess and the reflecting mirror is hingedly mounted in this recess so as to be closer to the plane of the photo-sensitive material. This permits the imaging plane of the view finder to be closer to the optical axis of the camera and accordingly permits the lens and prism of the view finder to be closer to the optical axis so that they protrude a lesser distance above the camera outline.

BRIEF DESCRIPTION OF DRAWINGS

The nature, objects and advantages of the invention will be more fully understood from the following description of a preferred embodiment illustrated by way of example in the accompanying drawings in which.

DESCRIPTION OF PREFERRED EMBODIMENT

Figure 1:
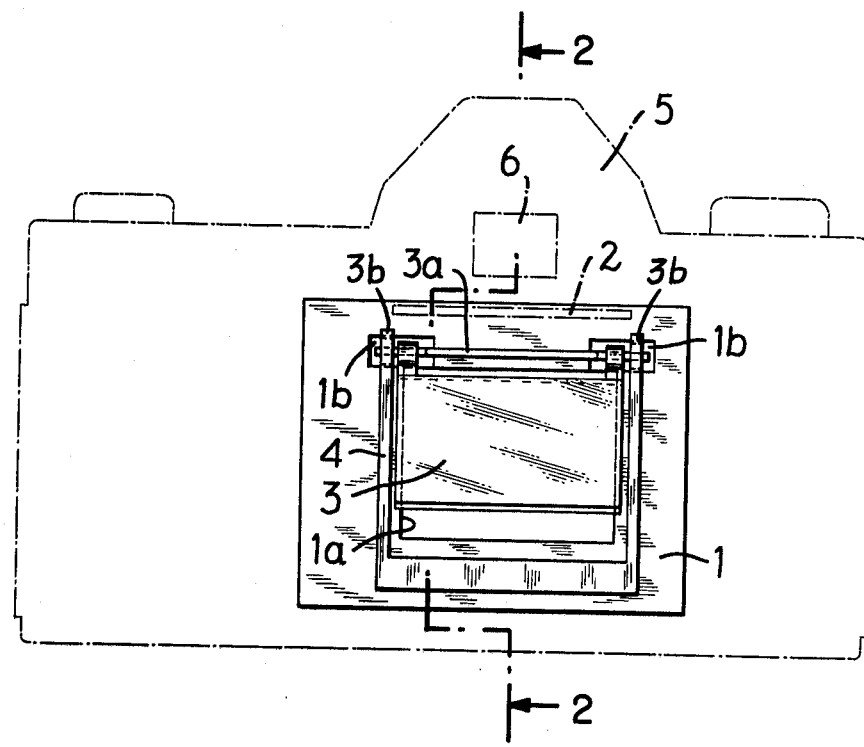
FIG. 1 is a front view of the view finder, mirror and shutter base plate assembly of a single lens reflex camera in accordance with the invention but with the camera shown only in outline

In the drawings there is shown by way of example a single lens reflex camera having a lens 7, reflecting mirror 3 in a mirror box 4, a shutter base plate 1, shutter blades 8 and a cover plate 9. The plane of the film is indicated by the letter F. The view finder of the camera comprises an imaging plane 2 above the reflecting mirror 3, a prism 5 and a viewing lens 6.

FIG. 1 is a front view showing the application of the shutter and view finder of the present invention to a single lens reflex camera. The shutter if fitted on the camera so that the opening 1a formed in the shutter base plate 1 coincides with the exposing window. The reflecting mirror 3 directs light from the lens 7 (FIG. 2) to the imaging plane 2 and is pivotally supported to swing about an axis 3a on the mirror box 4 formed around the opening 1a so that the mirror can swing up from the position shown in FIG. 2 to a position in which it is approximately horizontal. The image formed on the imaging plane 2 is reflected in the prism 5 arranged above the imaging plane 2 and can be viewed through the viewing lens 6 of the view finder.

Figure 2:
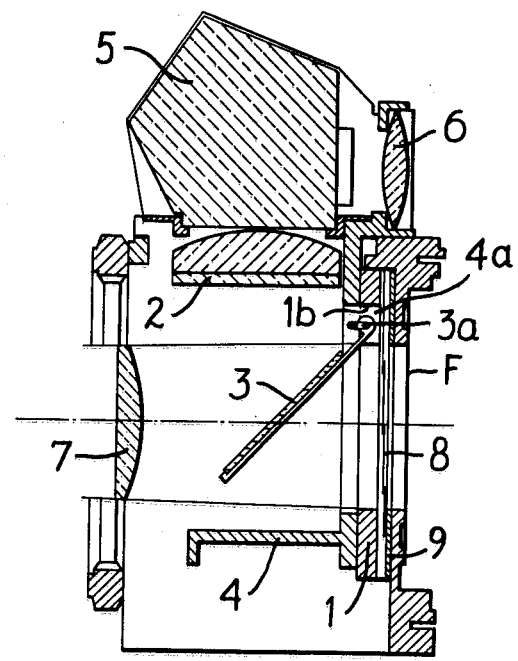
FIG. 2 is a cross-sectional view in the plane of the optical axis.

FIG. 2 is a section taken in the plane of the optical axis as seen from the right in FIG. 1. The light having passed through the partially illustrated photographing lens 7 is reflected by the reflecting mirror 3 to the image in plane 2 and the image of the object being photographed is focused thereon. The image of the object being photographed is reflected by the prism 5 and can be viewed through the viewing lens 6 of the finder.

In the front face of the shutter base plate 1 there are provided laterally spaced rectangular recesses 1b to receive rearwardly projecting portions 4a of the mirror box 4 which support the hinge pin 3a which forms the pivotal axis of the reflecting mirror 3. End portions of the pin 3a on which hinge portions 3b of the mirror are pivoted are offset rearwardly so as to be disposed in the recesses 1b while an intermediate portion lies in front of the base plate 1. The pivotal axis of the mirror 3 is thus located rearwardly of the front face of the shutter base plate 1. A space for actuating the shutter blades 8 is formed between the base plate 1 and a cover plate 9 which is supported on the shutter base plate behind it.

As can be seen clearly in the drawings the camera can be made smaller by bringing the upwardly protruding prism 5 closer to the optical axis of the camera. However, the relationship among the imaging plane 2, the prism 5 and the finder 6 is fixed under certain conditions. Accordingly in order to make the camera small while maintaining this relationship the imaging plane 2 must be lowered toward the optical axis.

On the other hand in order for the image of the object being photographed to be clearly focused on the imaging plane 2 and on the film, the imaging plane 2 and the film plane F must be in conjugate relation to the reflecting mirror 3. Therefore when the imaging plane 2 approaches the optical axis of the camera, the reflecting mirror 3 inevidently must approach the film plane F. In accordance with the invention this is achieved by supporting the axis 3a for the reflecting mirror 3 in a recess in the shutter base plate 1.

By this construction the imaging plane 2 and prism 5 can be brought closer to the optical axis of the camera so that the upward protrusion of the prism 5 can be reduced and the overall height of the camera can be decreased. Instead of the axis 3a being inserted into a rectangular recess in the shutter base plate 1 as shown in FIG. 1a a recess can be provided at the top periphery of the base plate 1 by bringing the axis 3a further upward close to the imaging plane 2. In this case the assembling of the shutter and the mirror box turns out to be quite simple.

As can clearly understood from the foregoing explanation an the accompanying drawings by forming rectangular recess 1b or notched parts such as recesses in the base plate 1 for inserting and supporting the axis 3a of the reflecting mirror 3 into the shutter base plate 1 the base plate can be relatively thick robust plate and the imaging plane 2 of the view finder in conjugate position with the film plane F can be brought closer to the optical axis of the camera and the height of the camera can accordingly be decreased. Moreover as the reflecting mirror 3 retreats toward the film plane F the camera lens 7 can also be moved closer to the film plane F thus causing a synergistic effect in reducing the overall size of the camera.

While an preferred embodiment of the invention has been illustrated in the drawings and is herein particularly described it will be understood that variations and modifications can be made and that the invention is in no way limited to the illustrated embodiment.

What we claim is:

1. In a single lens reflex camera, the combination of a shutter assembly comprising a shutter base plate, a cover plate rearwardly of the shutter base plate and in front of the film plane of the camera and shutter between said shutter base plate and said cover plate, said shutter base plate being thick to provide a robust construction, a mirror box in front of said shutter base plate, a reflection mirror hingedly supported in said mirror box, an imaging plane above said mirror in conjugate relation to the film plane of the camera, a viewing lens and a prism for reflecting an image on said imaging plane to said viewing lens, the front face of said shutter base plate being recessed within the thickness of said shutter base plate, the rear face of said shutter base plate being plane, and the hinge axis of said mirror being in the thus formed recessing and being located rearwardly of the front face of said shutter base plate and within the thickness of said shutter base plate, whereby the mirror is positioned closer to said film plane, and said imaging plane, prism and viewing lens are positioned closer to the optical axis of the camera to reduce the overall height and thickness of the camera.

2. A single lens reflex camera according to claim 1, in which side portions of said mirror box have rearwardly projecting portions in which said mirror is hingedly supported by a hinge pin received in holes in said rearwardly projecting portions and in which said rearwardly projecting portions of said mirror box are received in said recessing of said base plate.

3. A single lens reflex camera according to claim 2, in which said recessing in said shutter base plate comprises laterally spaced recesses separated by an unrecessed portion of said shutter base plate and in which end portions of said hinge pin are offset rearwardly to be received in said recess while an intermediate portion of said hinge pin lies in front of the front face of said shutter base plate.

* * * * *